United States Patent
Cibaldi

[19]

[11] Patent Number: 5,846,480
[45] Date of Patent: Dec. 8, 1998

[54] ALUMINUM REMELTING FURNACE, IN PARTICULAR FOR MELTING ALUMINUM SCRAP TO BE RECYCLED

[75] Inventor: Enzo Cibaldi, Brescia, Italy

[73] Assignee: Deral S.p.A., Brescia, Italy

[21] Appl. No.: 794,591

[22] Filed: Feb. 3, 1997

[30] Foreign Application Priority Data

Feb. 9, 1996 [IT] Italy .................................. MI96A0249

[51] Int. Cl.⁶ ................................................ C22B 21/00
[52] U.S. Cl. ........................ 266/158; 266/200; 266/900; 266/901
[58] Field of Search .................... 266/200, 158, 266/900, 901

[56] References Cited

U.S. PATENT DOCUMENTS

| | | | |
|---|---|---|---|
| 2,264,740 | 12/1941 | Brown | 266/901 |
| 3,702,242 | 11/1972 | Fernandes | 266/901 |
| 3,933,343 | 1/1976 | Rawlings | 266/900 |
| 4,010,935 | 3/1977 | Stephens | 266/900 |
| 4,319,921 | 3/1982 | Pryor et al. | 266/901 |
| 4,578,111 | 3/1986 | Gillespie et al. | 266/901 |
| 5,026,030 | 6/1991 | Inukai et al. | 266/901 |
| 5,673,900 | 10/1997 | Riley | 266/901 |

FOREIGN PATENT DOCUMENTS 0 167 915   1/1986   European Pat. Off. .
0 658 726   4/1938   Germany .

*Primary Examiner*—Scott Kastler
*Attorney, Agent, or Firm*—Oblon, Spivak, McClelland, Maier & Neustadt, P.C.

[57] ABSTRACT

An aluminum remelting furnace for recycling scrap. In order to prevent atmospheric dispersion of toxic substances from the combustion of aluminum scrap contaminants, the furnace includes a loading chamber positioned on the upper wall of the furnace which is provided with a lower door and an upper door. During loading, the lower door is opened while the upper door remains closed to prevent the escape of the contaminant substances which remained enclosed within the loading chamber. After closing the lower door, the contaminant substances are fed to a post-combustion chamber and then to a gas treatment and purification system.

20 Claims, 5 Drawing Sheets

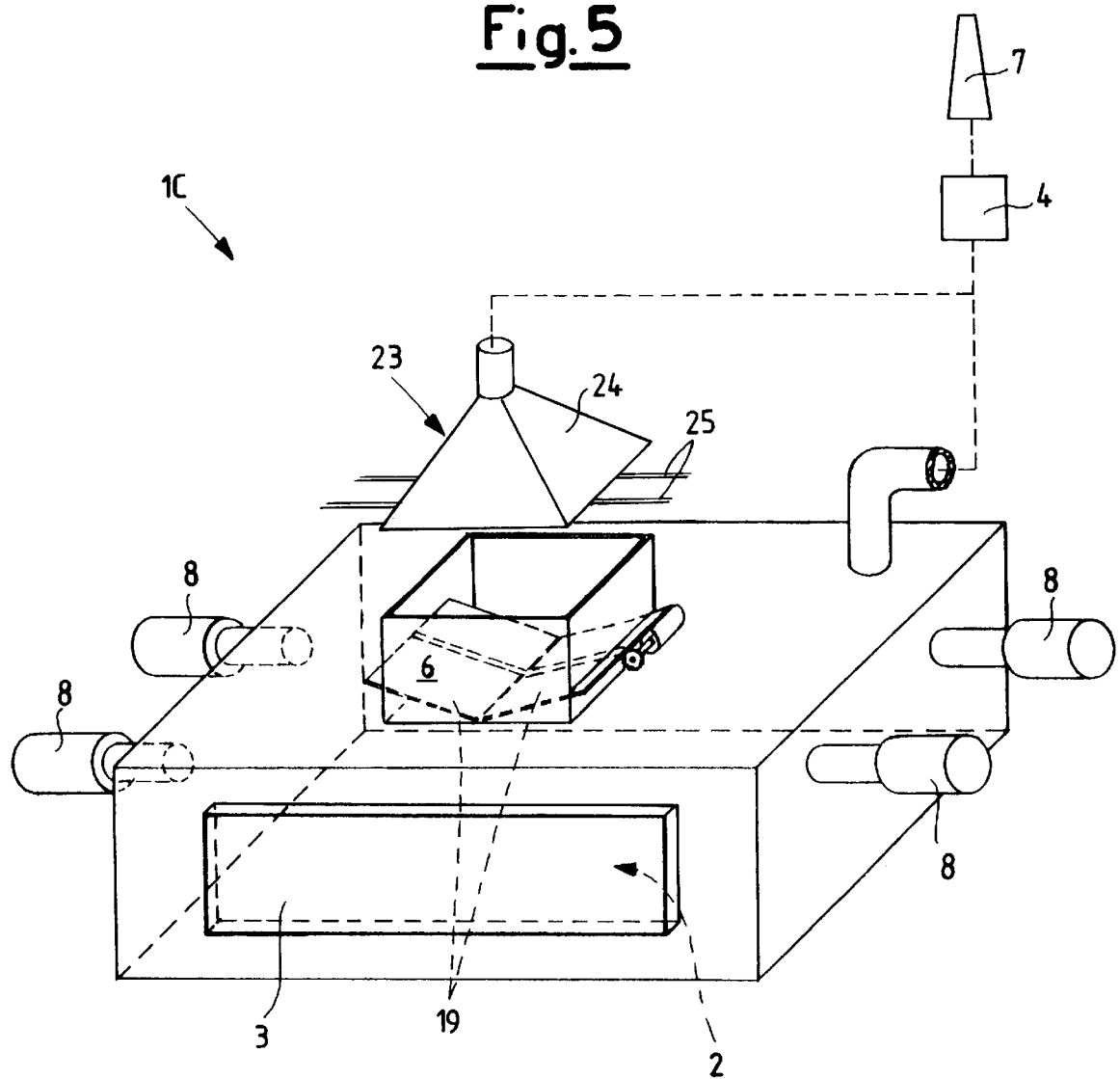

ALUMINUM REMELTING FURNACE, IN PARTICULAR FOR MELTING ALUMINUM SCRAP TO BE RECYCLED

This invention relates to an aluminium remelting furnace, in particular for melting aluminium scrap to be recycled. For economical reasons, collected materials for recycling, and aluminium in particular, cannot be currently sorted by splitting each collected item on the basis of the various materials which it contains. However this splitting takes place in the furnace during the melting of the aluminium scrap, in that metals of melting point higher than aluminium remain isolated in the liquid phase and can hence be easily identified and removed, whereas materials oxidizable by combustion result in gaseous compounds which spontaneously separate from the bath by convection. Unfortunately these gaseous compounds contain toxic substances in that they mainly derive from the combustion of rubber, plastics, coating layers, adhesives and similar materials which contaminate aluminium scrap.

Consequently each time the mouth of the furnace is opened (for example to further load it with aluminium scrap to be melted), said gaseous compounds escape to the atmosphere, with obvious consequences.

The main object of the present invention is therefore to obviate the aforesaid drawback by providing a melting furnace for aluminium and in particular aluminium scrap to be recycled, which is able to prevent or eliminate gaseous escapes occurring mainly during furnace loading, which is currently done by feeding the aluminium scrap into the furnace through an aperture in a lateral wall which remains open during the entire loading operation, usually carried out by a mechanical shovel or loaders. A further object of the present invention is to provide an aluminium remelting furnace which during said loading operation reduces environmental dispersion to a minimum, including of the heat contained in the furnace, so reducing the quantity of pollutant gases deriving from the combustion of the fuel which produces the make-up heat.

These objects are attained by an aluminium remelting furnace, in particular for melting aluminium scrap to be recycled.

While loading the aluminium scrap into the melting chamber, the lower door is opened while the upper door remains closed to prevent the fumes and gaseous compounds containing toxic substances from escaping into the atmosphere. Consequently as the fumes and gaseous compounds cannot escape from said loading chamber, environmental pollution is prevented.

When the aluminium scrap has been loaded, this being done all at once by gravity, the lower door is also closed so that the gaseous compounds containing toxic substances remain trapped in the loading chamber, from which they are withdrawn and fed to the stack via purification means. In addition the heat transferred by the gaseous compounds containing toxic substances to the loading chamber, together with the heat reaching said chamber by conduction through the walls in consideration of the particular position of the chamber, is recovered so increasing the temperature of the subsequently loaded aluminium scrap waiting in said loading chamber, ie of the aluminium scrap waiting to be melted.

The further object of reducing environmental dispersion of the heat contained in the furnace is hence also attained. The invention is described hereinafter by way of non-limiting example with reference to the accompanying figures, which illustrate some possible embodiments thereof.

BRIEF DESCRIPTION OF THE DRAWINGS

FIG. 5 is a schematic view of a third embodiment, also relating to a "wet hearth" furnace, and which differs from the preceding by its particular constructional simplicity.

Figure 1:
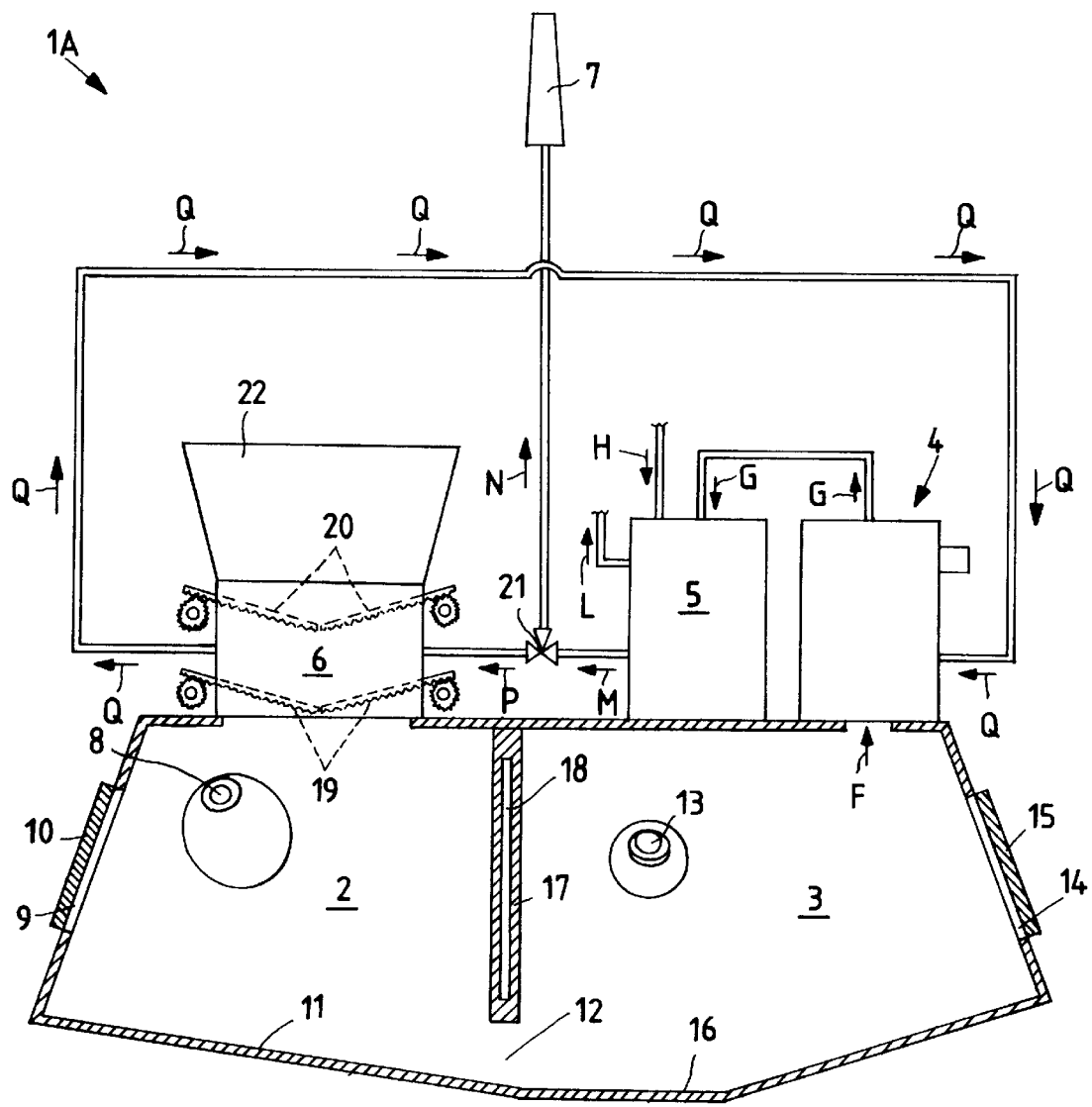
FIG. 1 is a schematic view of a first embodiment of the invention. This embodiment is preferred because it relates to a "dry hearth" furnace.
Figure 2:
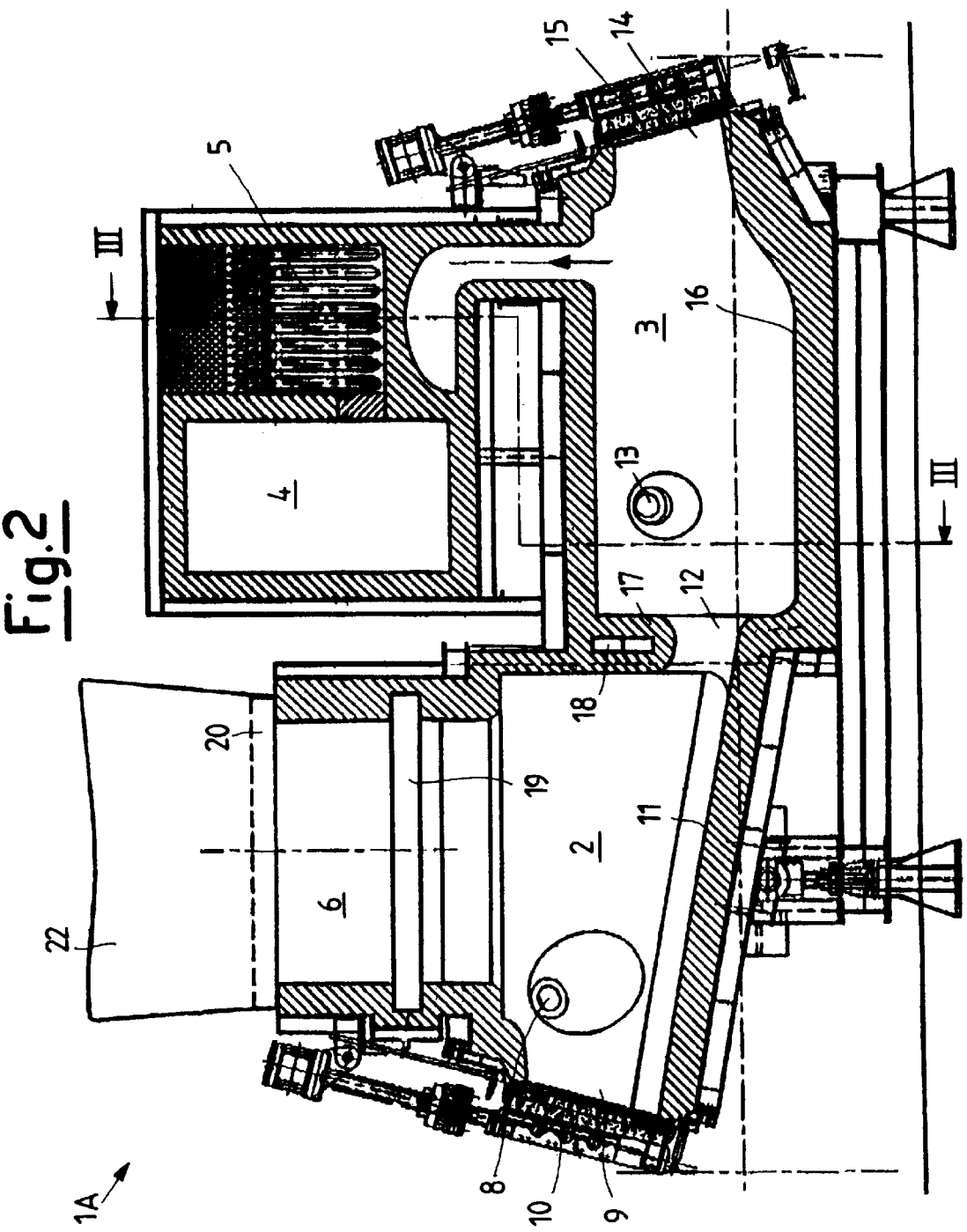
FIG. 2 is a section through the "dry hearth" furnace of the first embodiment of the present invention.
Figure 3:
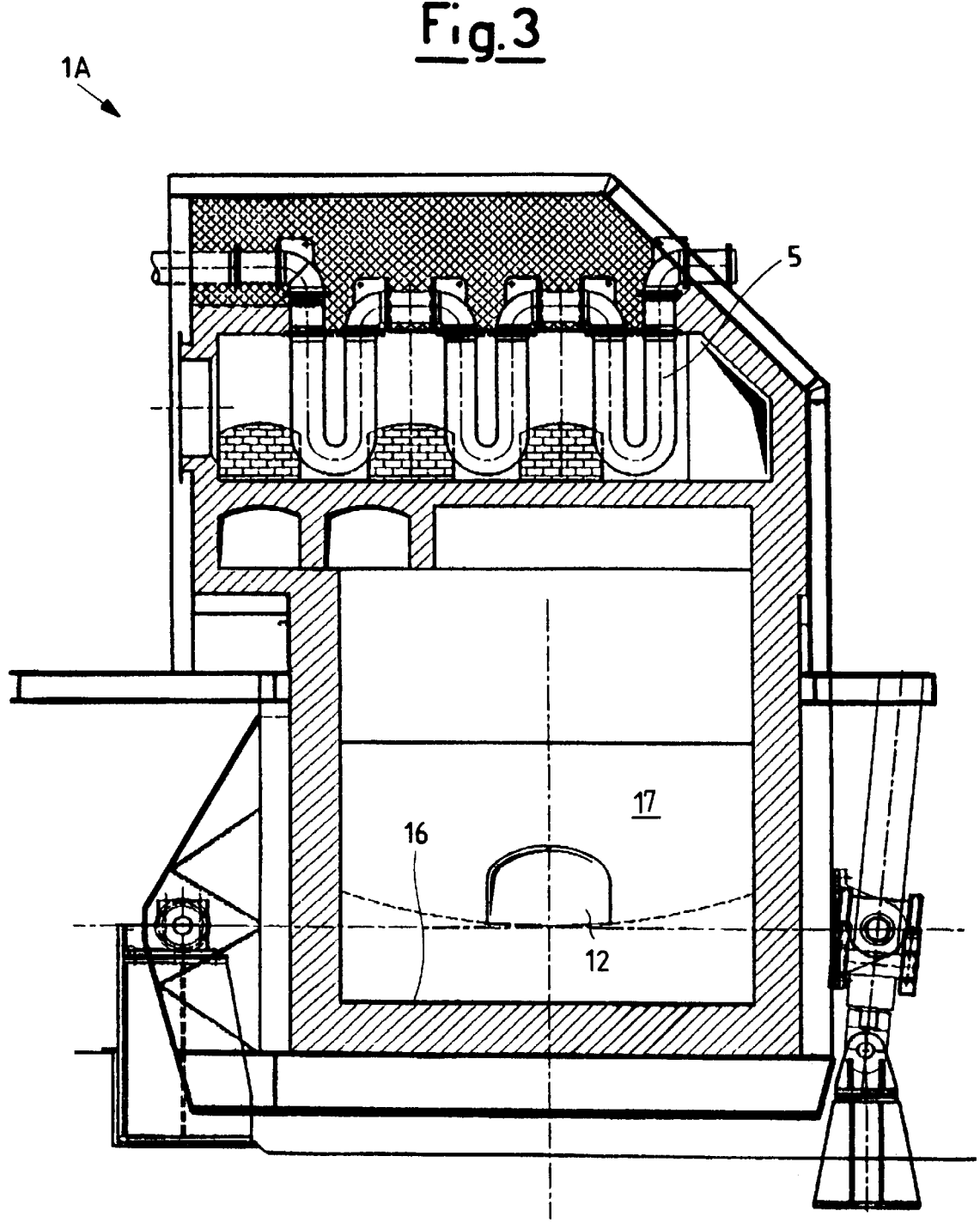
FIG. 3 is a section on the line III—III of FIG. 2.

With particular reference to FIGS. 1–3 the furnace of the first embodiment, indicated overall by 1A, comprises essentially: at least one first or melting chamber 2, a second or waiting chamber 3 for the molten material, purification means 4 for the fumes and/or gases, an air-air heat exchanger 5, a loading chamber 6, and a stack.

The first or melting chamber 2 is provided with at least one first burner 8, and at least one first lateral mouth 9 closable by a first door 10. The melting chamber 2 has its base or "hearth" 11 inclined towards a port 12. In this manner the molten aluminium runs away along the base and passes through the port 12 leaving the "hearth dry", from which the name of this type of furnace derives. Those materials having a melting point higher than aluminium (for example steel, cast iron etc.) separate from the aluminium and remain on the base 11 in the solid state, and can hence be easily identified and removed.

The second or waiting chamber 3 for the molten material is provided with a second burner 13, and a second lateral mouth 14 closable by a second door 15. The second chamber 3 has its base 16 at a lower level than the base 11 of the first chamber 2, with which it communicates via said port 12, which in the real example shown in FIG. 2 is of weir type. The port 12 is provided in a dividing wall 17 which in the illustrated example is cooled internally by an air stream which passes through an interspace 18. The loading chamber 6 is provided with at least one lower door 19 (which in the example shown in FIG. 1 comprises two panels) which separates it from the first or melting chamber 2, and an upper door 20 (which in the example shown in FIG. 1 also comprises two panels) which separates it from the atmosphere. The panels of the lower door 19 and upper door 20 could be inclined downwards (as shown in FIG. 1) to facilitate the sliding of the aluminium scrap along it when opened. The interior of said loading chamber 6 is connected for fluid flow (arrows Q, G, M, N) to the stack 7 via purification means 4 for the fumes and gaseous compounds which contain toxic substances. In the illustrated example, the second or waiting chamber is also connected for fluid flow (arrows F, G, M, N) to the stack 7 via the said purification means 4 for the fumes and gaseous compounds which contain toxic substances. Preferably the purification means for the fumes and gaseous compounds which contain toxic substances comprise at least one post-combustion chamber 4 which is not described in detail as it is of known type. The purification means 4 can also be integrated into or formed from other known devices such as sleeve filters and/or spray purifiers, possibly positioned immediately before the stack 7. The fumes and gaseous compounds created within the first chamber 2 and second chamber 3 and containing toxic substances are conveyed (arrow F) into the purification means. An air-air heat exchanger 5 withdraws the heat from the fumes and gaseous compounds (arrows G) leaving the post-combustion chamber 4 and transfers it to the combustion air taken from the atmosphere (arrow H) and intended for the burners 8 and 13 (:arrow L), so increasing the energy efficiency of these latter.

The fumes originating from the post-combustion chamber 4 (arrows G) and leaving the heat exchanger 5 (arrow M) are directed to a three-way valve 21 which divides them by directing a part (arrow N) to the stack 7 and the remainder (arrow P) towards the interior of the loading chamber 6. The fumes leaving the loading chamber 6 (arrow Q) are returned to the post-combustion chamber 4 in that although being originally "clean", in reacting with the aluminium scrap they may extract further toxic substances. The loading chamber 6 is provided with a loading hopper 22 which, by housing a further charge of aluminium scrap, facilitates the supply of aluminium scrap to the furnace.

During the operation of the furnace 1A, to provide it with a required further charge of scrap the procedure is as follows. The flows P and Q are interrupted. The lower door 19 is opened and the aluminium scrap contained in the loading chamber 6 falls, all at once, into the underlying melting chamber 2. The lower door 19 is reclosed so that the fumes and gaseous compounds containing toxic substances which may have reached the loading chamber 6 remain trapped by being blocked by the upper door 20 which remains closed. The flows P and Q are re-activated so evacuating the fumes and gaseous compounds containing toxic substances from the loading chamber 6. If the hopper 22 is provided and if it has been previously filled, it is necessary merely to open the upper door 20 to achieve virtually immediate filling of the loading chamber 6 by gravity with a further charge of aluminium scrap, which passes into the loading chamber by gravity all at once. The upper door 20 is reclosed and the hopper 22 can be again filled by the operator when he considers it most suitable, for example when he is not busy. By virtue of the invention, it is apparent that the furnace can operate continuously and hence without down-times. The idea on which the invention is based can also be utilized in wet hearth furnaces, ie those shown in FIG. 4 (indicated by 1B) and in FIG. 5 (indicated by 1C). For simplicity, in said figures the corresponding elements are indicated by the same reference numerals.

Figure 4:
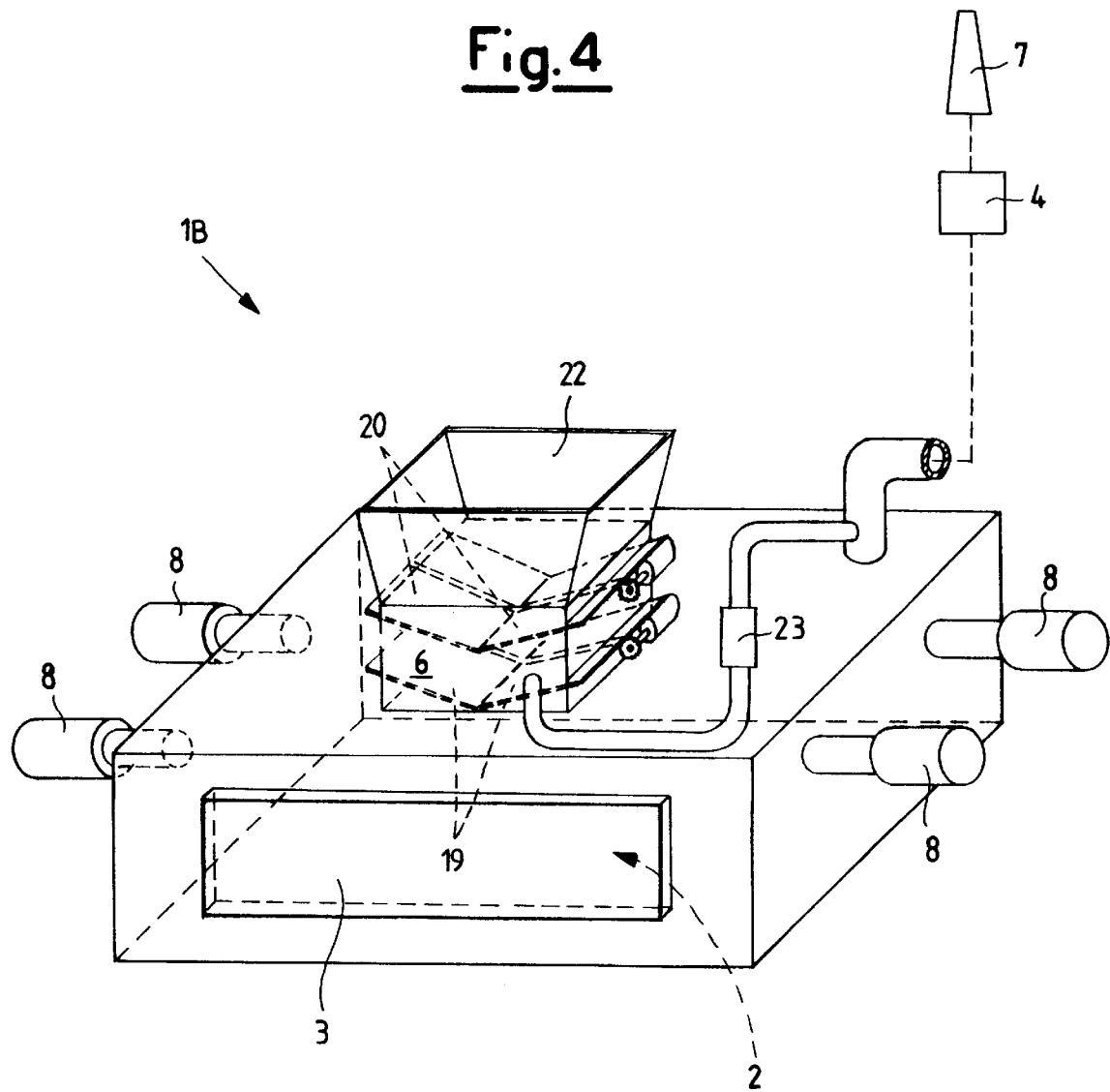
FIG. 4 is a schematic view of a second embodiment, relating to a "wet hearth" furnace.

With particular reference to FIG. 4, the aluminium remelting furnace in particular for melting aluminium scrap to be recycled is of the type commonly known as "wet hearth". It comprises essentially a melting chamber 2, a loading chamber 6, suction means 23, purification means 4 and a stack 7. The melting chamber 2 comprises an aperture 3 for loading the aluminium to be remelted, and a plurality of burners 8 for melting the loaded aluminium. The loading chamber 6 is substantially identical to that of the furnace 1A, to which reference should be made for brevity.

The interior of the chamber 6 is connected in sequence to the suction means 23, to the purification means 4 for the fumes and gaseous compounds containing toxic substances, and to the stack 7. The furnace 1B can also comprise at least one heat exchanger arranged to withdraw heat from the fumes and gaseous compounds before being expelled into the atmosphere through the stack 7, and to transfer it to the combustion air intended for the burners 8 and/or for the loading chamber 6. The purification means 4 are of known type, such as a post-combustion chamber which processes the fumes and gases leaving the furnace. The heat produced by said post-combustion chamber can be transferred to the loading chamber 6 and/or to the burners 8, to reduce the furnace energy consumption.

During the operation of the furnace 1B, to provide it with a required further charge of scrap the procedure is as follows. The lower door 19 is opened and the aluminium scrap contained in the loading chamber 6 falls, all at once, into the underlying melting chamber 2. The lower door 19 is reclosed so that the fumes and gaseous compounds containing toxic substances which may have reached the loading chamber 6 remain trapped by being blocked by the upper door 20 which remains closed. The suction device 23 is operated to evacuate the fumes and gaseous compounds containing toxic substances from the loading chamber 6 and to feed them to the purification means 4. If the hopper 22 is provided and if it has been previously filled, it is necessary merely to open the upper door 20 to achieve virtually immediate filling of the loading chamber 6 by gravity with a further charge of aluminium scrap. The upper door 20 is reclosed and the hopper 22 can be again filled by the operator when he considers it most suitable, for example when he is not busy. In this case the pre-heating of the aluminium scrap is achieved by heating the loading chamber 6 both by the transfer of heat from the fumes and gaseous compounds originating from the melting chamber 2 when the door 19 is open, and by conduction through the upper wall of the furnace 1B. With particular reference to FIG. 5, the aluminium remelting furnace in particular for melting aluminium scrap to be recycled and indicated overall by 1C is of the "wet hearth" type, it differing from that indicated by 1B in FIG. 4 mainly by the structure of the loading chamber 6 and of the suction device 23. The loading chamber 6 is simplified in that it is provided only with the lower door 19. The suction device 23 comprises a hood 24 positionable vertically above the loading chamber 6 preferably by movement along guides 25.

In the furnace 1C the pre-heating of the aluminium scrap contained in the loading chamber 6 is achieved mainly by conduction through the upper wall of the furnace 1C.

If desired, again in this case the purification means 4 could be associated (as in the case of the furnace 1A) with a heat exchanger to be able to feed the burners with combustion air at a temperature higher than ambient in order to improve combustion efficiency.

Notwithstanding its structural simplicity and hence low-cost construction and operation, the furnace 1C also achieves the objects of reducing pollution and dispersion of heat into the environment mainly for the following reasons:

during the loading operation, the actual aluminium to be remelted, in falling into the furnace, acts as a barrier to the escape of heat, fumes and gaseous compounds containing toxic substances;

the aluminium scrap is poured into the furnace all at once by gravity, hence the time for which the door 19 is open is extremely small, so that the escape of heat, fumes and gaseous compounds containing toxic substances is consequently reduced to a minimum. However any substances which do escape during the loading operation are recovered by the hood 24 of the suction device 23;

the aluminium scrap is preheated by positioning the loading chamber 6 above the furnace 1C.

I claim:

1. An aluminum remelting furnace for melting aluminum scrap to be recycled, comprising:

at least one melting chamber provided with at least one first burner, at least one first lateral mouth closable by a first door and having a hearth inclined towards at least one port;

at least one waiting chamber for molten material, provided with at least one second burner, at least one second lateral mouth closable by at least one second door and having a base at a lower level than said hearth of said melting chamber, said hearth and said base communicating by way of said at least one port;

gas purification means interposed between said waiting chamber and a stack;

at least one loading chamber provided with a lower door which separates said loading chamber from said melting chamber and an upper door which separates said loading chamber from the atmosphere, said loading chamber being connected for fluid flow to the stack by way of the gas purification means.

2. A furnace as claimed in claim 1, wherein the loading chamber is provided with a loading hopper.

3. A furnace as claimed in claim 1, wherein the gas purification means are the same both for the waiting chamber and for the loading chamber.

4. A furnace as claimed in claim 1, wherein the gas purification means comprise at least one post-combustion chamber.

5. A furnace as claimed in claim 4, further comprising an air-air heat exchanger which withdraws heat from the fumes leaving the post-combustion chamber and transfers it to the combustion air intended for the burners.

6. A furnace as claimed in claim 5, wherein the fumes from the post-combustion chamber leaving the heat exchanger are directed to a three-way valve which divides them by directing a part to the stack and the remainder towards the interior of the loading chamber, the fumes leaving this latter being returned to the post-combustion chamber.

7. A furnace as claimed in claim 1, wherein said port is formed in a dividing wall provided with a cooling interspace.

8. A furnace as claimed in claim 7, wherein the dividing wall is cooled by an air stream.

9. A furnace as claimed in claim 1, wherein the port interposed between the melting chamber and waiting chamber is a weir.

10. An aluminum remelting furnace for melting aluminum scrap to be recycled, comprising:

at least one melting chamber provided with at least one mouth for loading said melting chamber with aluminum scrap to be remelted, and at least one burner for melting said aluminum scrap;

at least one loading chamber connected to said melting chamber which underlies said loading chamber, by way of a door;

wherein said aluminum scrap contained in said loading chamber is preheated at least by heat leaving walls of the furnace;

said scrap being loaded into said melting chamber by gravity all at once so as to limit to a minimum the dispersion into the atmosphere of heat, fumes and gaseous compounds having toxic substances which escape from the melting chamber when the door is opened.

11. A furnace as claimed in claim 10, wherein the loading chamber is connected to a suction device and to purification means for the fumes and gaseous compounds containing toxic substances which form in it.

12. A furnace as claimed in claim 10, wherein the loading chamber is also provided upperly with a door.

13. A furnace as claimed in claim 12, further comprising a loading hopper positioned above the loading chamber.

14. A furnace as claimed in claim 12, wherein the loading chamber is connected to a suction device and to a purification device for the gases which form in it.

15. A furnace as claimed in claim 10, wherein the suction device comprises a hood positionable vertically above the loading chamber when this latter communicates with the underlying melting chamber.

16. A furnace as claimed in claim 10, further comprising at least one heat exchanger arranged to extract heat from the fumes and gaseous compounds before these are expelled into the atmosphere via the stack, in order to transfer it to the combustion air intended for the burners.

17. A furnace as claimed in claim 12, wherein the upper door and lower door comprise at least one panel slidable perpendicular to the flow through the loading chamber of the aluminium scrap to be melted.

18. A furnace as claimed in claim 17, wherein the slidable doors are inclined in the direction of flow of the aluminium scrap towards the melting chamber.

19. A furnace as claimed in claim 12, wherein the heat extracted from the fumes leaving the furnace is supplied to the loading chamber.

20. A furnace as claimed in claim 12, wherein the purification means comprise a post-combustion chamber which processes the fumes and gases leaving the furnace, the heat produced by said post-combustion chamber being supplied to the loading chamber.

* * * * *